May 21, 1957

J. T. HOWE ET AL 2,792,634

TOLERANCE INSPECTION GAGE

Filed May 11, 1951

INVENTORS
Frank Kerze, Jr.
BY James T. Howe

Roland A. Anderson
ATTORNEY

United States Patent Office 2,792,634
Patented May 21, 1957

2,792,634

TOLERANCE INSPECTION GAGE

James T. Howe, Oak Ridge, Tenn., and Frank Herze, Jr., Washington, D. C., assignors to the United States of America as represented by the United States Atomic Energy Commission Application May 11, 1951, Serial No. 225,891

6 Claims. (Cl. 33—168)

This invention relates generally to inspection devices or tolerance gages for determining whether or not the spacing between fabricated parts lies in the range between maximum and minimum permissible values.

The production item for which the present gage was especially developed consisted of a stack of identical spaced plates of substantial area, the spaced stack being formed by attaching opposite sides of the plates to a pair of transverse side walls. The spacing between the plates was critical and had to uniformly meet a given design value within limited plus and minus tolerances. It was necessary to check the spacing between each pair of plates at a multitude of points all along the surface of the plates, and the various types of commercially available inspection gages were investigated for this purpose. It was found, however, that none of the available gages were entirely satisfactory from the standpoint of the rapidity with which the multiple inspection could be made and from the standpoint of ability to make inspections deep in the interior of the stack.

Accordingly, the primary object of the invention is to provide a simple, cheap and readily manipulatable tolerance inspection gage for determining whether the distance between spaced surfaces conforms within allowed tolerances to a given design value.

Another object of the invention is to provide a gage, as in the preceding object, which is especially adapted to the case wherein inspections must be made at a multiplicity of points longitudinally and laterally along the surfaces.

Another object of the invention is to provide a gage, as in the preceding objects, which is adapted to make inspections on the far side of obstructions or inward projections on the surfaces.

The above and other objects of the invention will become apparent from the following description when taken in connection with the accompanying drawings.

Figure 1:
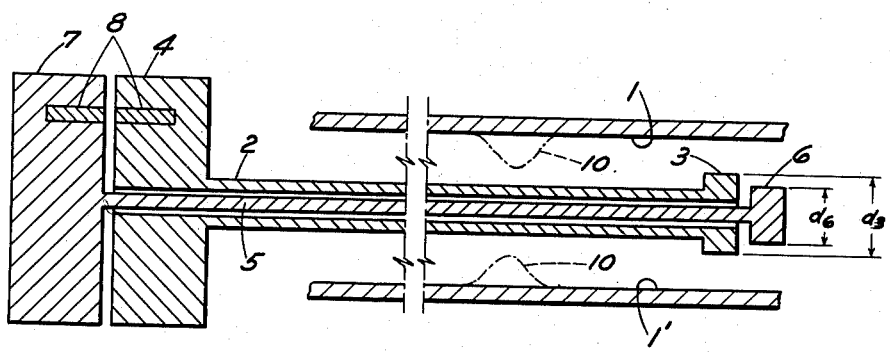
Fig. 1 is a sectional elevation view of the tolerance inspection gage of the present invention disposed in operable position with respect to the two surfaces the spacing between which is to be checked.

Referring now to the drawings, reference numerals 1 and 1' indicate two spaced parallel surfaces of substantial length and width, the distance between which surfaces is to be inspected for conformance with a specified design value. The design specification for the spacing between surfaces 1 and 1' may be, for example, 0.100"±10%, in which case the inspector must be able to ascertain that the actual distance between the surfaces at no point is greater than 0.110" or less than 0.090".

The inspection gate, itself, is sufficiently elongated so that it may be inserted between the surfaces 1 and 1' to any desired point along the entire length of these surfaces. The gage comprises an elongated hollow tube 2 having a hollow transverse cam 3 attached to its inner end and a transverse circular knob or operating handle 4 attached to its outer end. Mounted concentrically within the tube 2 is an elongated rod 5 which extends through the tube 2 and its associated cam 3 and handle 4 and is rotatable with respect thereto. Rod 5 also has a transverse cam 6 attached to its inner end and a transverse circular knob or operating handle 7 attached to its outer end.

Figure 2:
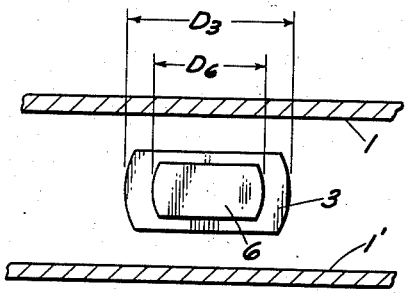
Fig. 2 is an end view looking at the apparatus of Fig. 1 from the right.

As shown in Fig. 2, the cross sectional shape of cam 6 is such that it has a major dimension $D_6$ and a smaller minor dimension $d_6$. Similarly, the shape of cam 3 is such that it has a major dimension $D_3$ and a minor dimension $d_3$. The actual shape of the cam is not critical, and they have been illustrated as circular with opposite portions cut away along parallel chords. It will be appreciated however that other shapes, such as an ellipse, would provide the necessary major and minor dimensions.

The major dimension $D_3$ of cam 3 is made exactly equal to the maximum permissible spacing between surfaces 1 and 1', that is, 0.110" in the illustrated example, and the major dimension $D_6$ of cam 6 is made exactly equal to the minimum permissible spacing between the surfaces, that is, 0.090 in the illustrated example. While the minor dimensions $d_3$ and $d_6$ of the respective cams are not critical, they should be substantially less than the minimum permissible spacing between the surfaces.

In operation, the inspector by holding the gage at the handles 4 and 7 can move the cams 3 and 6 to successive inspection points longitudinally and laterally of the surfaces. At each inspection point, the operator will first attempt to rotate handle 4 while holding handle 7 stationary, and then attempt to rotate handle 7 while holding handle 4 stationary. It will be apparent that if the spacing between the surfaces 1 and 1' conforms to design tolerances, handle 7 and cam 6 will be freely rotatable whereas handle 4 and cam 3 will not be free to rotate a full revolution. Thus, if the operator finds that he cannot rotate handle 7 a full revolution, he knows that the spacing between the surfaces is less than the minimum permissible value, and he rejects the part for that reason. On the other hand, if the operator finds that he is able to rotate handle 4 freely, he knows that the spacing is greater than the maximum permissible value and he rejects the part for that reason.

It will be evident that the cams 3 and 6 may be transposed insofar as their major dimensions $D_3$ and $D_6$ are concerned. In other words, the major dimension $D_6$ of cam 3 may be made equal to the minimum permissible value of spacing between the surfaces and the major dimension $D_6$ of cam 6 may be made equal to the maximum permissible value of spacing.

As indicated in Fig. 1, suitable constraining means may be beneficially associated with handles 4 and 7 to tend to retain the cams 3 and 6 in alignment, that is, with their major dimensions aligned as shown in Fig. 2. The constraining means is illustrated in Fig. 1 as a pair of facing magnets 8 imbedded or attached to the respective handles. It will be apparent that other conventional types of constraining means, such as a spring or rubber band, may be substituted for the magnets.

Figure 3:
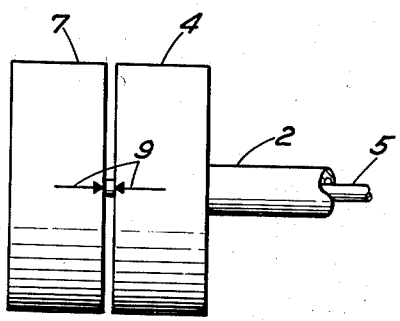
Fig. 3 is a plan view of the handle portion of the gage.

As indicated in Fig. 3, the circumferential surface of the handles 4 and 7 are preferably provided with a pair of associated indices 9 to provide a visual reference as to the relative positions of cams 3 and 6. The indices 9 are positioned such that they are aligned when the cams are in the position shown in Fig. 2, that is, with their major dimensions in alignment.

It will be seen that we have provided a simple, cheap, convenient and rapidly operable tolerance inspection gage which is particularly well adapted for quickly checking at a multiplicity of points the spacing between spaced surfaces of a fabricated part. An outstanding advantage of the present gage is its ability to reach deep or normally inaccessible locations. For example, it will be apparent that the present gage may be used to check the spacing at an inspection point disposed at the far side of an obstruction of one kind or another, such as is indicated schematically in dotted lines at 10 in Fig. 1. For this purpose, the minor dimensions $d_3$ and $d_6$ of cams 3 and 6, respectively, are made smaller than the minimum expected clearance between such obstructions.

Since many changes could be made in the above construction and many apparently widely different embodiments of this invention could be made without departing from the principles thereof, it is intended that all matter contained in the above description, or shown in the accompanying drawings, shall be interpreted as illustrative and not in a limiting sense.

What is claimed is:

1. An inspection device for checking whether the spacing between spaced surfaces conforms to predetermined permissible tolerances, comprising an elongated hollow tube, a hollow cam fixedly attached to one end of said tube, an elongated rod extending coaxially through said tube ad cam and mounted for rotation with respect to said tube and cam, a second cam fixedly attached to one end of said rod, the other end of said rod protruding beyond the other end of said tube, one of said cams having a maximum transverse dimension equal to the maximum permissible spacing between the surfaces and the other of said cams having a maximum transverse dimension equal to the minimum permissible spacing between the surfaces, said two cams being axially offset from one another.

2. An inspection device for checking whether the spacing between spaced surfaces conforms to predetermined permissible tolerances, comprising an elongated hollow tube, a hollow cam fixedly attached to one end of said tube, an elongated rod extending coaxially through said tube and cam and mounted for rotation with respect to said tube and cam, a second cam fixedly attached to one end of said rod adjacent said hollow cam, the other end of said rod protruding beyond the other end of said tube, each of said cams having major and minor transverse dimensions, the minor dimensions of both of said cams being substantially less than the minimum permissible spacing between the surfaces, the major dimension of one of said cams being equal to the maximum permissible spacing between the surfaces, and the major dimension of the other of said cams being equal to the minimum permissible spacing between said cams, said two cams being axially offset from one another.

3. An inspection device, as claimed in claim 2, wherein the major dimension of the hollow cam is equal to the maximum permissible spacing between said surfaces.

4. An inspection device for checking whether the spacing between spaced surfaces conforms to predetermined permissible tolerances, comprising an elongated hollow tube, a hollow cam fixedly attached to one end of said tube, an elongated rod extending coaxially through said tube and cam and mounted for rotation with respect to said tube and cam, a second cam fixedly attached to one end of said rod adjacent said hollow cam, the other end of said rod protruding beyond the other end of said tube, each of said cams having major and minor transverse dimensions, the minor dimensions of both of said cams being substantially less than the minimum permissible spacing between the surfaces, the major dimension of one of said cams being equal to the maximum permissible spacing between the surfaces, and the major dimension of the other of said cams being equal to the minimum permissible spacing between said cams, and means disposed at the end of said device remote from said cams for indicating alignment of the major dimensions of said cams, said two cams being axially offset from one another.

5. An inspection device for checking whether the spacing between spaced surfaces conforms to predetermined permissible tolerances, comprising an elongated hollow tube, a hollow cam fixedly attached to one end of said tube, an elongated rod extending coaxially through said tube and cam and mounted for rotation with respect to said tube and cam, a second cam fixedly attached to one end of said rod adjacent said hollow cam, the other end of said rod protruding beyond the other end of said tube, each of said cams having major and minor transverse dimensions, the minor dimensions of both of said cams being substantially less than the minimum permissible spacing between the surfaces, the major dimension of one of said cams being equal to the maximum permissible spacing between the surfaces, and the major dimension of the other of said cams being equal to the minimum permissible spacing between said cams, and means disposed at the end of said device remote from said cams for constraining said cams to aligned positions, said two cams being axially offset from one another.

6. An inspection device for checking whether the spacing between spaced surfaces conforms to predetermined permissible tolerances, comprising an elongated hollow tube, a hollow cam fixedly attached to one end of said tube, an elongated rod extending coaxially through said tube and cam and mounted for rotation with respect to said tube and cam, a second cam fixedly attached to one end of said rod adjacent said hollow cam, the other end of said rod protruding beyond the other end of said tube, each of said cams having major and minor transverse dimensions, the minor dimensions of both of said cams being substantially less than the minimum permissible spacing between the surfaces, the major dimension of one of said cams being equal to the maximum permissible spacing between the surfaces, and the major dimension of the other of said cams being equal to the minimum permissible spacing between said cams, and a first and a second handle fixedly attached to said tube and rod, respectively, at the end remote from the associated cams, said two cams being axially offset from one another.

References Cited in the file of this patent

UNITED STATES PATENTS

| | | |
|---|---|---|
| 2,472,139 | Aldeborgh et al. | June 7, 1949 |
| 2,577,262 | Meuller et al. | Dec. 4, 1951 |

FOREIGN PATENTS

| | | |
|---|---|---|
| 151,768 | Great Britain | Oct. 7, 1920 |
| 74,415 | Sweden | May 31, 1932 |
| 633,638 | Germany | July 31, 1936 |
| 230,848 | Switzerland | Apr. 17, 1944 |
| 608,171 | Great Britain | Sept. 10, 1948 |
| 616,542 | Great Britain | Jan. 24, 1949 |